(12) United States Patent
Wijitphan

(10) Patent No.: US 7,803,384 B2
(45) Date of Patent: Sep. 28, 2010

(54) METHOD TO STIMULATE AQUILARIA RESIN FORMATION BY WOUNDING ON THE AQUILARIA TREE

(76) Inventor: Pheeraphan Wijitphan, 126/2050 Soi 19/1 Tiwanon Road, Pakkred, Nonthaburi (TH) 11120

( * ) Notice: Subject to any disclaimer, the term of this patent is extended or adjusted under 35 U.S.C. 154(b) by 0 days.

(21) Appl. No.: 11/862,726

(22) Filed: Sep. 27, 2007

(65) Prior Publication Data
US 2009/0084030 A1    Apr. 2, 2009

(51) Int. Cl.
*A61K 36/00* (2006.01)
(52) U.S. Cl. .................. 424/195.18; 424/769; 424/775
(58) Field of Classification Search ........................ None
See application file for complete search history.

(56) References Cited

U.S. PATENT DOCUMENTS

2002/0194780 A1*  12/2002  Blanchette et al. ............... 47/8

FOREIGN PATENT DOCUMENTS

SU              897168 B  *  1/1982

* cited by examiner

*Primary Examiner*—Christopher R. Tate
*Assistant Examiner*—Deborah A. Davis
(74) *Attorney, Agent, or Firm*—Volpe and Koenig, P.C.

(57) ABSTRACT

A method for stimulating resin formation in all breeds of Aquilaria tree. The method including selecting an Aquilaria tree that is at least five years old, having a trunk diameter between 4 inches and 6 meters. The method also includes wounding the tree by removing section of an outer layer of the trunk and forming holes in the wounding. Finally, the resin which results from the holes in the wound is harvested.

4 Claims, 5 Drawing Sheets

METHOD TO STIMULATE AQUILARIA RESIN FORMATION BY WOUNDING ON THE AQUILARIA TREE

FIELD OF INVENTION

The present invention relates to processes for making wounds on Aquilaria trees in order to stimulate Aquilaria resin formation.

BACKGROUND

Agarwood is a highly prized aromatic resinous wood. It has many common names, e.g., Agarwood, Eaglewood, Aloeswood, Agila wood, Aguru, Oud, Jinko, Kalambak, Grindsanah. The source of Agarwood is the Aquilaria tree.

Aquilaria is an evergreen tree that grows to 40 meters or more. Aquilaria trees produce a widely used resin which has a pleasant scent. However, in nature under certain pathological conditions, the Aquilaria tree can produce resin, however it takes a long time to produce a commercial quantity of resin.

U.S. patent application Ser. No. 10/807,665 explains a process and method to stimulate resin formation by wounding on an Aquilaria's trunk. However, the Inventor of the present invention found a new advantageous stimulation method that is described in this invention. The above patent describes wounding an Aquilaria tree in order to stimulate the production of resin.

SUMMARY

The invention provides, in a first embodiment, a method for stimulating resin formation in all breeds of Aquilaria tree. The method including selecting an Aquilaria tree that is at least five years old, having a trunk diameter between 4 inches and 6 meters. The method also includes wounding the tree by removing section of an outer layer of the trunk and forming holes in the wounding. Finally, the resin which results from the holes in the wound is harvested.

The present invention, in a second embodiment, relates to a method for stimulating production of heartwood in an Aquilaria tree. The method including selecting an Aquilaria tree that is at least five years old, having a trunk diameter between four inches to six meters. The method also includes creating wounding on the trunk of the Aquilaria by removing sections of an outer layer of the trunk and creating holes within the wounding. Resin that forms in the wound is removed and the process is carried out for approximately three years before the tree is felled to harvest the heartwood.

BRIEF DESCRIPTION OF THE DRAWINGS

The invention shall now be better described with reference to some embodiments thereof, illustrated merely as a non-limiting example in the attached drawings, wherein.

DETAILED DESCRIPTION OF THE PREFERRED EMBODIMENTS

The invention will now be described with reference to the drawings in order to help readers to understand the invention better and these drawings are considered partial to this invention by not limiting the scope of the invention. One skilled in the art may apply any functions of this invention to their professional operation.

Figure 1:
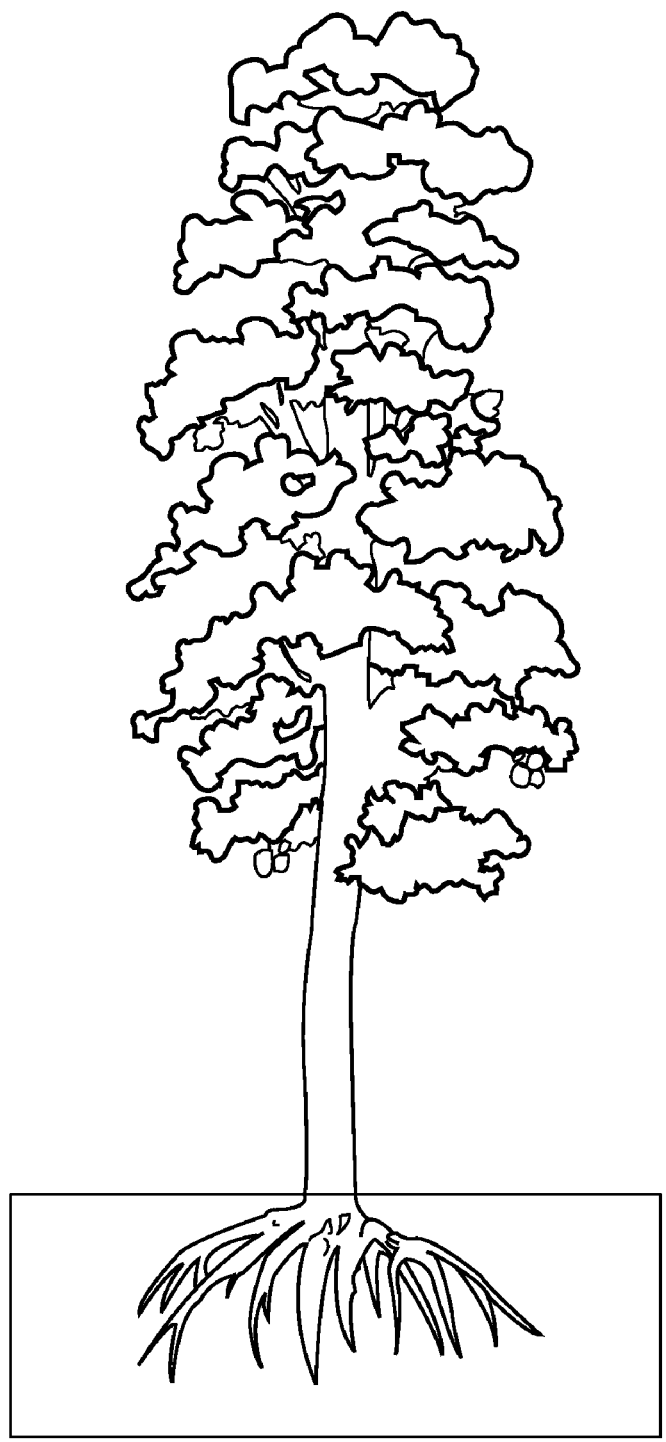
FIG. 1 depicts an Aquilaria tree.

Referring to FIG. 1, a selected Aquilaria tree is depicted. The age of the selected tree is at least five years old and has a diameter between 4 inches to 5 meters.

Figures 2, 2A:
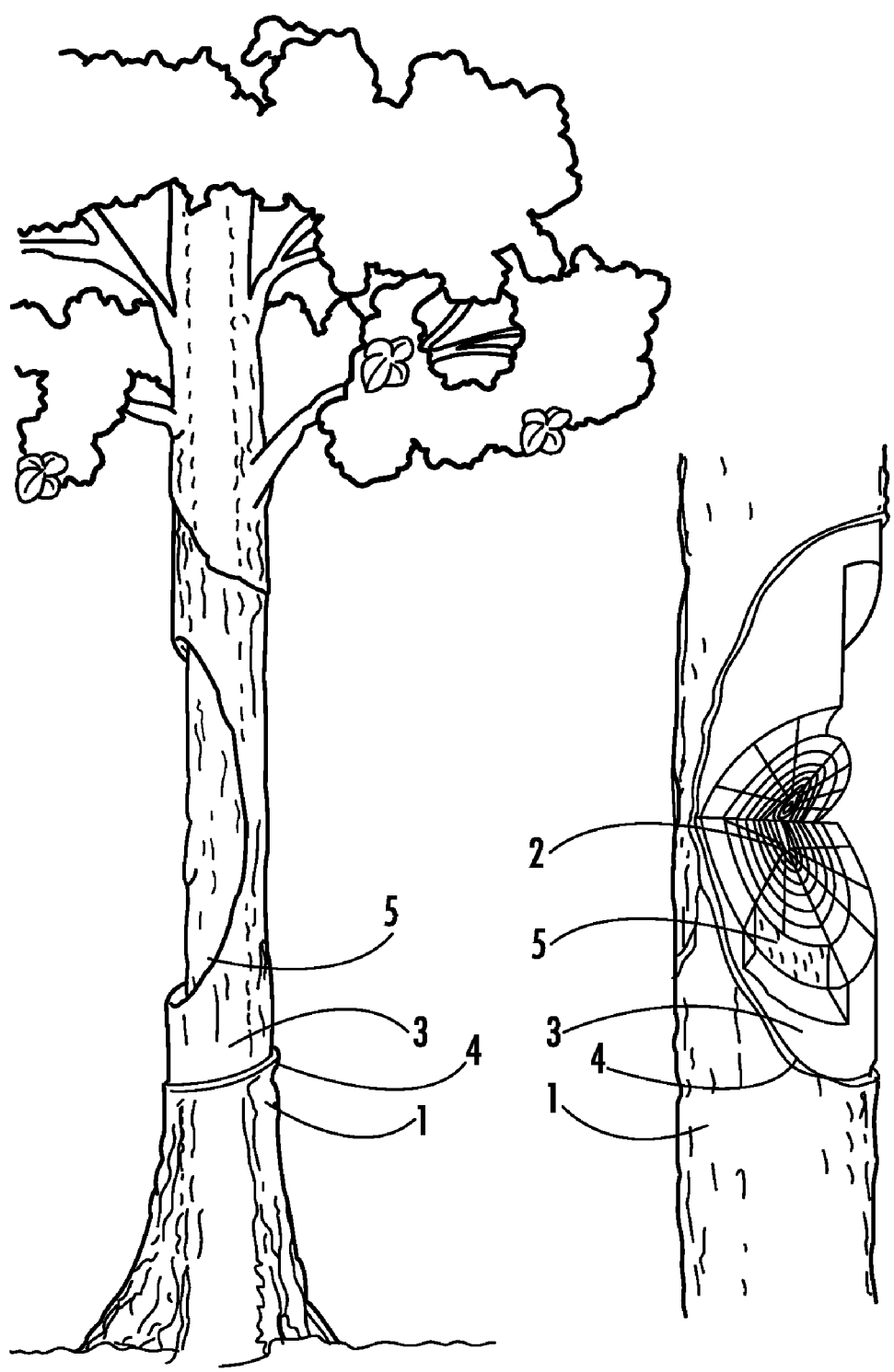
FIGS. 2, 2a are partial section views of an Aquilaria tree, showing portions of various layers removed.

FIGS. 2 and 2a show a partially section view of the structure of an Aquilaria tree beginning with outer layer 1, a partial section removed reveals phloem 4, which surrounds sapwood 3 or xylem, which in turn surrounds heartwood 5.

Figure 3A:
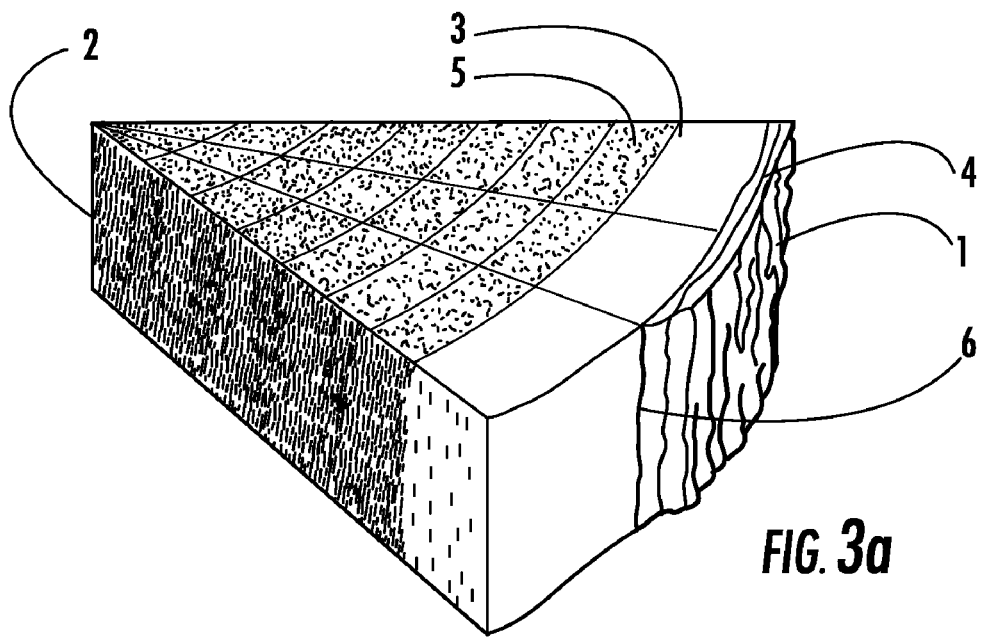
FIGS. 3, 3a are cross sections of an Aquilaria tree trunk.
Figure 3:
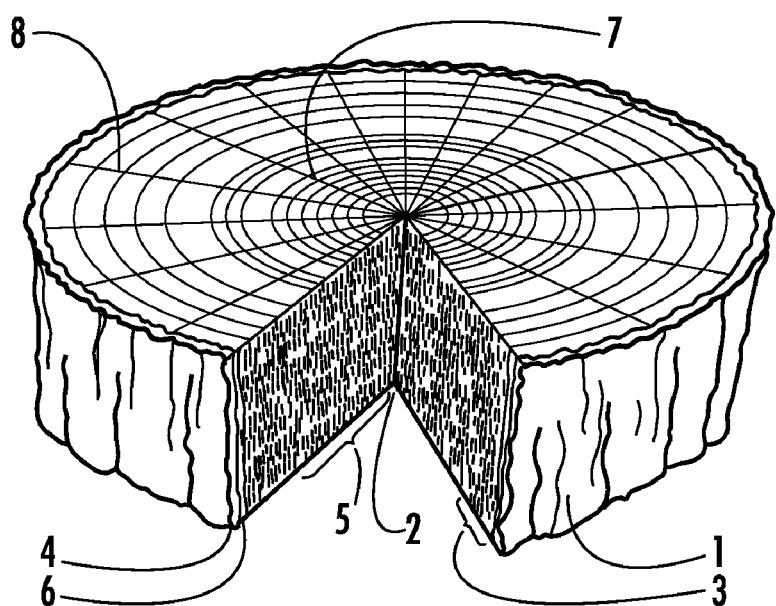

FIGS. 3 and 3a show cross sections of Aquilaria tree's trunk. Shown are annual rings 7, which increase yearly.

Figure 4:
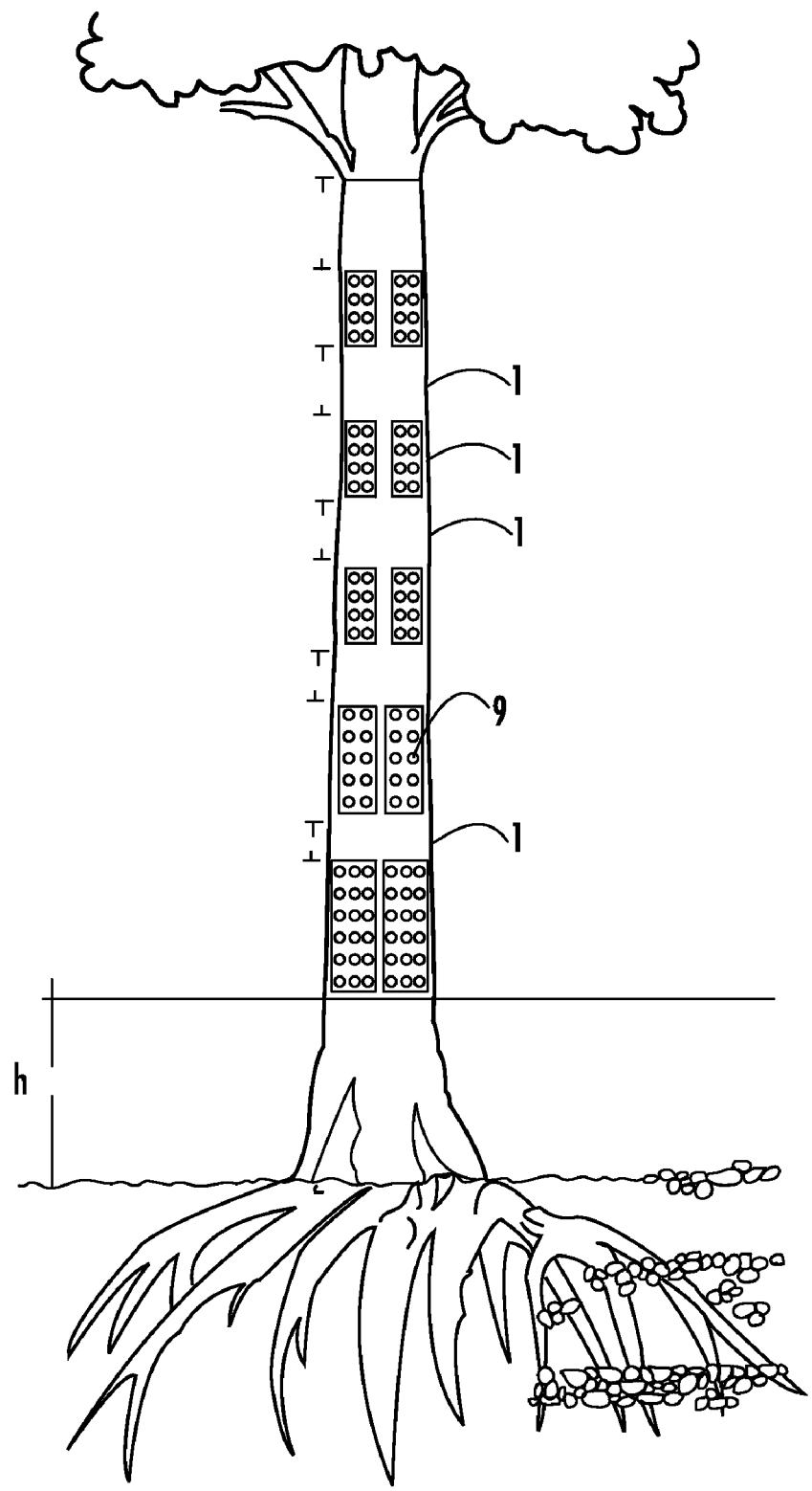
FIG. 4 depicts an Aquilaria tree having wounding.
Figure 5:
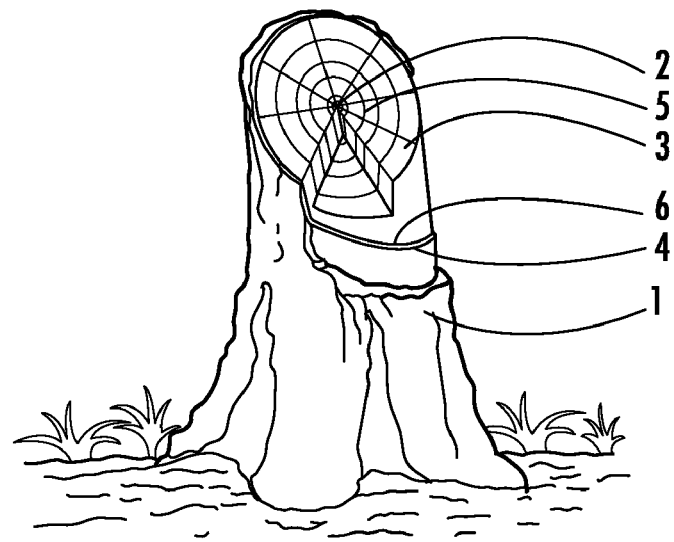
FIG. 5 depicts a partial section view of an Aquilaria stump, showing parts of various layers removed.
Figure 6:
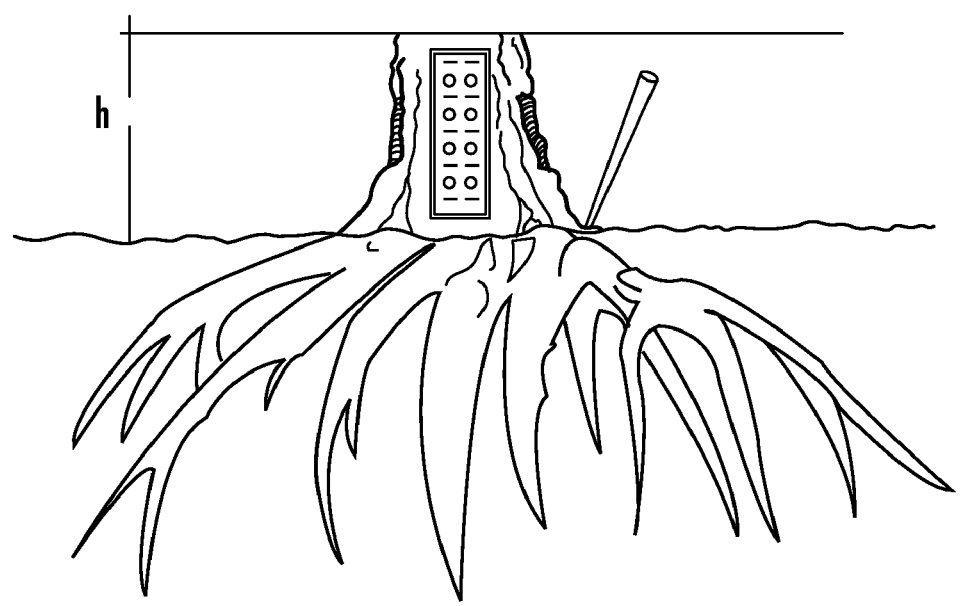
FIG. 6 depicts stump and root stimulation.

Referring to FIG. 4, a method for wounding Aquilaria tree is shown by removing the first outer layer 1 in a rectangular shape and wounding the tree by removing outer layer 1. Holes 9 are then made in the rectangular shaped wound. The depth of the hole should not extend into the Heartwood but should be sufficient to allow stimulant to penetrate. It should be understood that the wound can have different shapes, i.e. triangular, circular, etc.

Positioning of the wounds on the Aquilaria tree are shown in FIG. 4, can be throughout the tree, however, the number of wounds and depth of the holes 9 should not cause death to the tree.

After the tree has stimulated for two months, the resin is harvested by gently chipping the resinous wood layer piece by piece. A similar harvest is carried out once the resin is reformed. A third harvest is also carried out in the same way. All three harvests can be obtained in one year without cutting down the tree.

The process of removing the resinous wood, piece by piece, promotes resin to move from the outer layer into an inner layer and eventually into the heartwood. The resin is harvested by partially removing the resin that results from the wound by repeated chipping such that small chips are removed piece by piece while simultaneously inducing resin to move from an outer layer to an inner layer of the trunk. After the tree is stimulated in this fashion for three years, the tree is cut down at a height of 80-100 centimeters from ground and the heartwood is harvested.

The remaining Aquilaria stump is allowed to survive and sprouts forth new shoots. During this time resin formation is stimulated at the Aquilaria's roots. This technique requires 12-20 months to generate resin formation. During this time, the next generation of Aquilaria trees is cultivated along the lines as mentioned above.

The present invention is the result of the inventor studying the process of resin formation in all breeds of Aquilaria trees. The age of tree selected is at least five years old and has a diameter between 4 to 6 meters. The wounding process can begin earlier than the prior methods i.e., the selected Aquilaria tree, stimulated for two months, can have the first product harvested.

After the first harvest, stimulation is continued and a second harvest is obtained. Then stimulation is continued to get a third harvest. Through the method described below, three harvests can be obtained in a year. By the stimulation technique of the present invention, the tree does not need to be cut for resin extraction. A technique is used by chipping, little by little, the resinous wood in order to induce the resin to move from an outer layer (sapwood) into an inner layer and into the heartwood.

After the Aquilaria tree is stimulated for three years, the appropriate size of Agar's heartwood is obtained. The tree is cut at a height of 80-100 centimeters from the ground to harvest the heartwood. However, the stump is allowed to sprout and put forth shoots. The Aquilaria's roots are then stimulated to produce resin by a similar wounding technique. This step requires about 12-20 months. The next generation of Aquilaria is cultivated along with this step.

EXPLANATION OF NUMBERS AND SYMBOLS
USED IN DRAWINGS

1 Outer Layer
2 Pith
3 Sapwood or Xylem
4 Phloem
5 Heartwood
6 Cambium
7 Annual Ring
8 Ray
9 Holes

What is claimed is:

1. A method to stimulate the production of resin in a species of an Aquilaria tree comprising the steps of:
   a) selecting an Aquilaria tree between 5 to 400 years of age, having a trunk diameter between 4 inches and 6 meters;
   b) wounding the tree by removing a portion of an outer layer of the trunk;
   c) forming holes, arranged vertically in the wound, of a diameter between 0.5 to 3 inches, in the trunk; said holes extending from an outer shell, Xylem, of the trunk, to an interior portion, heartwood, of the trunk, thereby stimulating resin production and creating a resinous wood layer;
   d) chipping the resinous wood layer and simultaneously stimulating new resin production as in step c);
   e) cutting the tree, after three years of stimulation to provide a stump, at a height of 80-100 centimeters above the ground and collecting aromatic heartwood therefrom
   wherein the resin produced flows from the outer shell towards the heartwood and is ready for harvesting within 2.5 months from implementation of the method and is harvestable 2 to 3 times annually.

2. The method of claim 1, wherein roots of the stump are stimulated in order to stimulate resin formation.

3. The method of claim 2, wherein the resin is harvestable within 12-24 months from the stimulation of the roots.

4. The method of claim 2, wherein the stump is kept alive in order to induce new shoots.

* * * * *